United States Patent
Chang (10) Patent No.: US 7,870,644 B2
(45) Date of Patent: Jan. 18, 2011

(54) HINGE AND INTERFERENCE ASSEMBLY THEREOF

(75) Inventor: Jung-Bin Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 372 days.

(21) Appl. No.: 12/205,932

(22) Filed: Sep. 8, 2008

(65) Prior Publication Data
US 2010/0000047 A1    Jan. 7, 2010

(30) Foreign Application Priority Data
Jul. 1, 2008  (CN) .................... 2008 2 0301399 U (51) Int. Cl.
*E05D 11/10* (2006.01)

(52) U.S. Cl. .............................. 16/337; 16/330; 16/340; 16/303

(58) Field of Classification Search ........... 16/337–339, 16/342, 330, 303, 374, 376, 377, 340, 355, 16/239, 357, 360, 361, 362, 367; 361/679.06, 361/679.07, 679.08, 679.12, 679.27; 455/90.3, 455/575.1, 575.3, 575.8; 379/433.12, 433.13; 348/373, 333.01, 333.06, 794
See application file for complete search history.

(56) References Cited

U.S. PATENT DOCUMENTS

| 7,533,446 | B1 * | 5/2009 | Lin .............................. | 16/330 |
| 7,574,944 | B2 * | 8/2009 | Yang ........................... | 74/567 |
| 2007/0169312 | A1 * | 7/2007 | Ho et al. ....................... | 16/330 |
| 2007/0174996 | A1 * | 8/2007 | Lu et al. ....................... | 16/340 |
| 2007/0180656 | A1 * | 8/2007 | Chen et al. .................... | 16/340 |
| 2007/0199179 | A1 * | 8/2007 | Wang ........................... | 16/340 |
| 2009/0235489 | A1 * | 9/2009 | Chang et al. .................. | 16/340 |
| 2009/0271948 | A1 * | 11/2009 | Wang ........................... | 16/340 |
| 2009/0320243 | A1 * | 12/2009 | Wang et al. .................... | 16/303 |

* cited by examiner

*Primary Examiner*—Chuck Y. Mah
(74) *Attorney, Agent, or Firm*—Zhigang Ma (57) ABSTRACT

An exemplary interference assembly of a hinge includes a first element and a second element. The first element defines a through hole in a center, and a first depression portion in the side. A first raised portion protrudes from the side of the first element. The first depression portion and the first raised portion are opposite each other across the through hole. The second element defines a fixing hole in a center, and a second depression portion in a side facing the side of the first element for engaging with the first raised portion. A second raised portion protrudes from the side of the second element for engaging with the first depression portion. The second depression portion and the second raised portion are opposite each other across the fixing hole.

15 Claims, 7 Drawing Sheets

HINGE AND INTERFERENCE ASSEMBLY THEREOF

BACKGROUND

1. Field of the Invention

The present invention relates to a hinge and an interference assembly of the hinge.

2. Description of Related Art

A foldable device, such as a notebook computer, a foldable mobile phone, and so on, generally includes a base, and a cover pivotally mounted to the base via a hinge. To prevent the cover from hitting the base when the cover is rotated to cover the base, the hinge generally includes a male interference member and a female interference member for positioning the cover during rotation. The male interference member includes a first raised portion and a second raised portion. The female interference member includes a first depressed portion and a second depressed portion respectively for receiving the first and second raised portions, for positioning the male or female interference members. However, the male or female interference members need to be in constant contact with each other for smooth operation, but over time they may wear down and lose contact.

What is needed, therefore, is to provide a hinge that has two interference elements that can remain in constant contact with each other over time.

DETAILED DESCRIPTION

Figure 1:
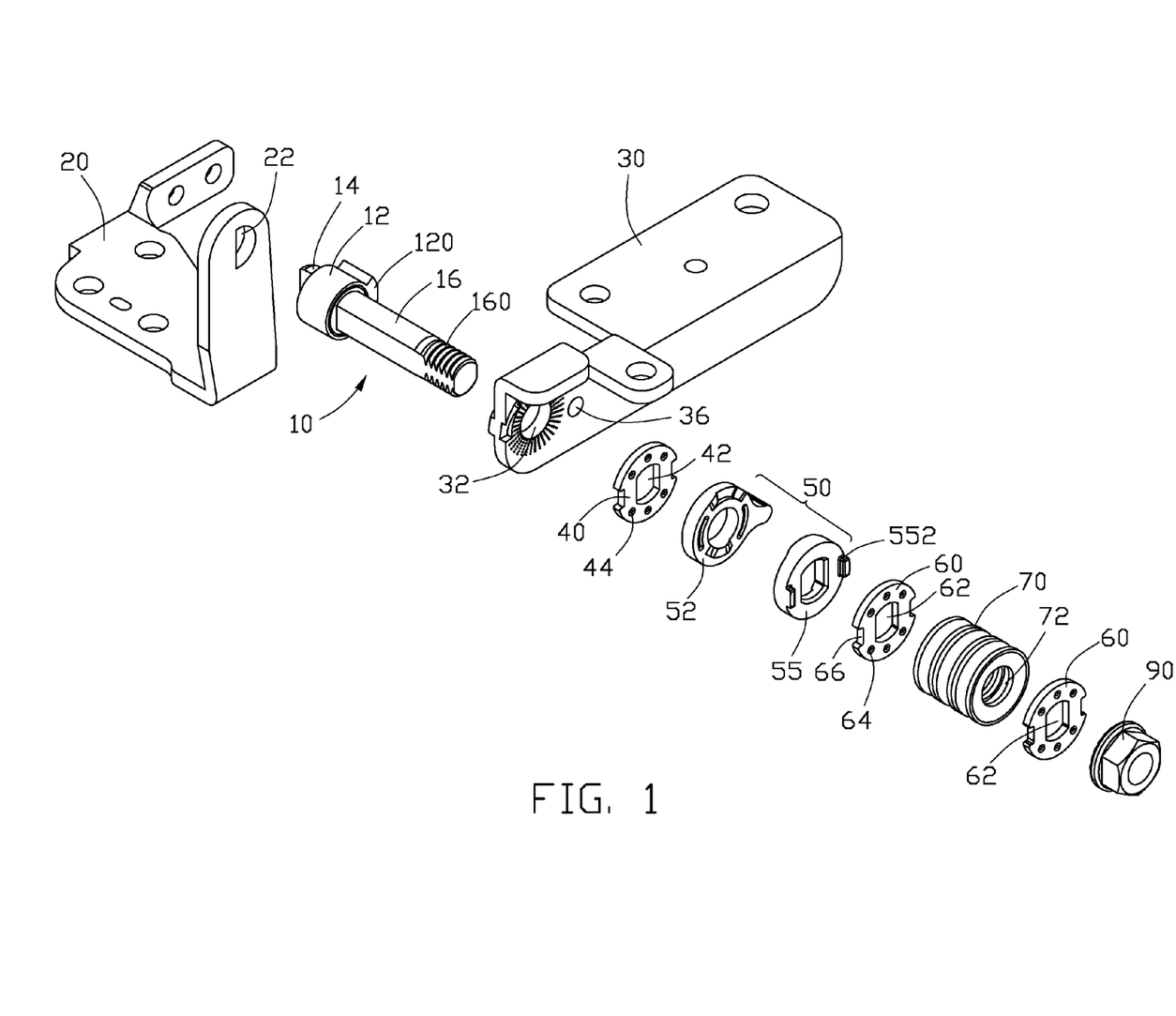
FIG. 1 is an exploded, isometric view of a hinge in accordance with a first embodiment of the present invention, the hinge including an interference assembly.
Figure 2:
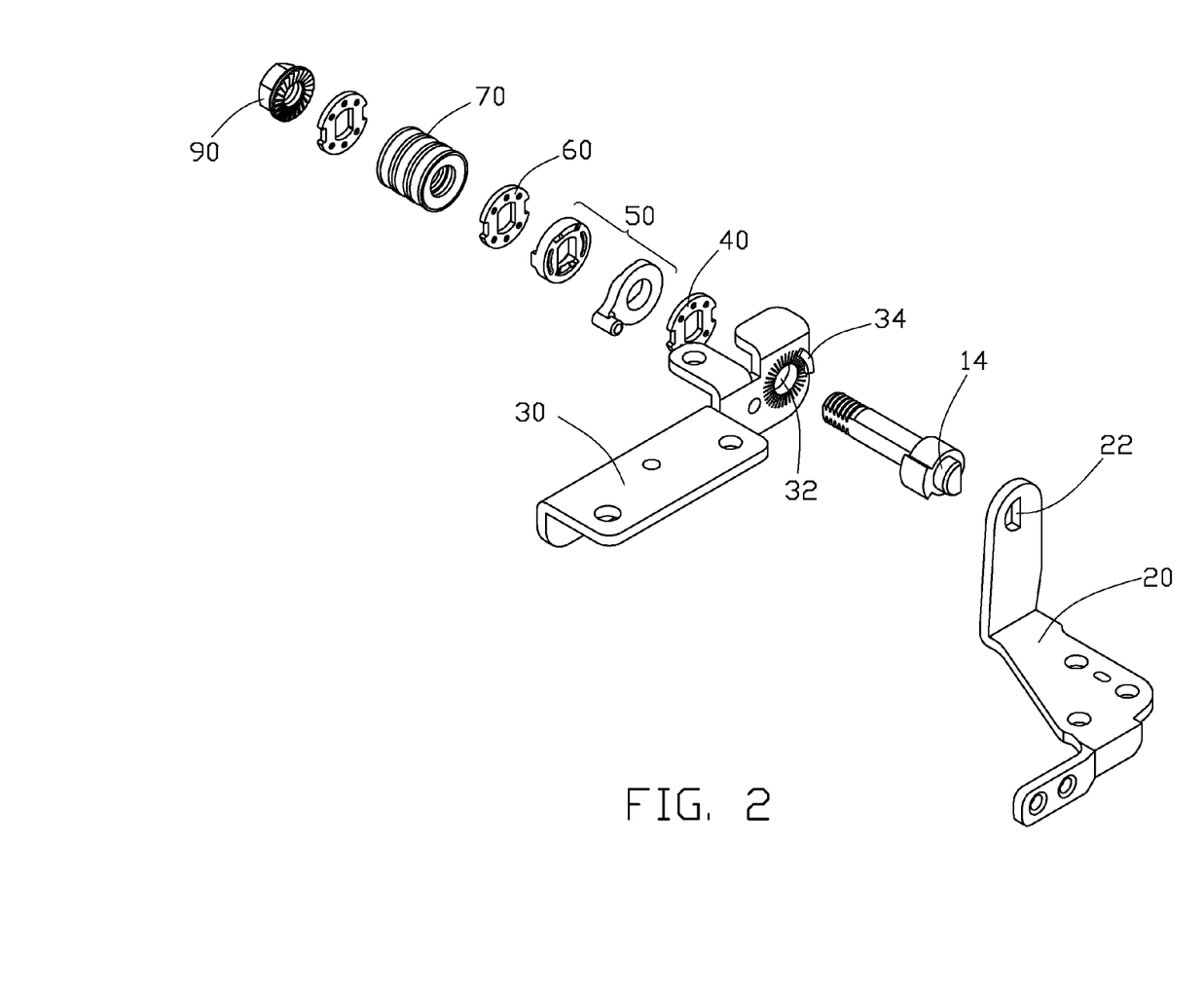
FIG. 2 is similar to FIG. 1, but viewed from another aspect.

Referring to FIGS. 1 and 2, a hinge in accordance with a first embodiment of the present invention includes a shaft 10, a first bracket 20, a second bracket 30, a washer 40, an interference assembly 50, two buffer members 60, a biasing member 70, and a fastener 90. In this embodiment, the fastener 90 is a screw cap.

The shaft 10 includes a washer-shaped main body 12 and a non-circular fixing rod 16 extending from an end of the main body 12. The fixing rod has a double-D shaped cross-section. A semicircular conjoining portion 14 extends from the opposite end of the main body 12. A stop portion 120 protrudes from a circumference of the main body 120. A distal end of the fixing rod 16 forms a threaded portion 160.

The first bracket 20 defines a semicircular fixing hole 22 for mating with the conjoining portion 14 of the shaft 10.

The second bracket 30 defines a circular through hole 32 for the shaft 10 extending therethrough, and a fastening hole 36 neighboring the through hole 32 therein. A blocking portion 34 surrounding the through hole 32 and opposite to the fastening hole 36 extends from the second bracket 30 toward the first bracket 20.

The washer 40 defines a double-D shaped through hole 42 for fitting about the fixing rod 16 of the shaft 12 and preventing rotation of the fixing rod 16, and a plurality of receiving holes 44 round the through hole 42 for receiving lubricating oil.

Figure 3:
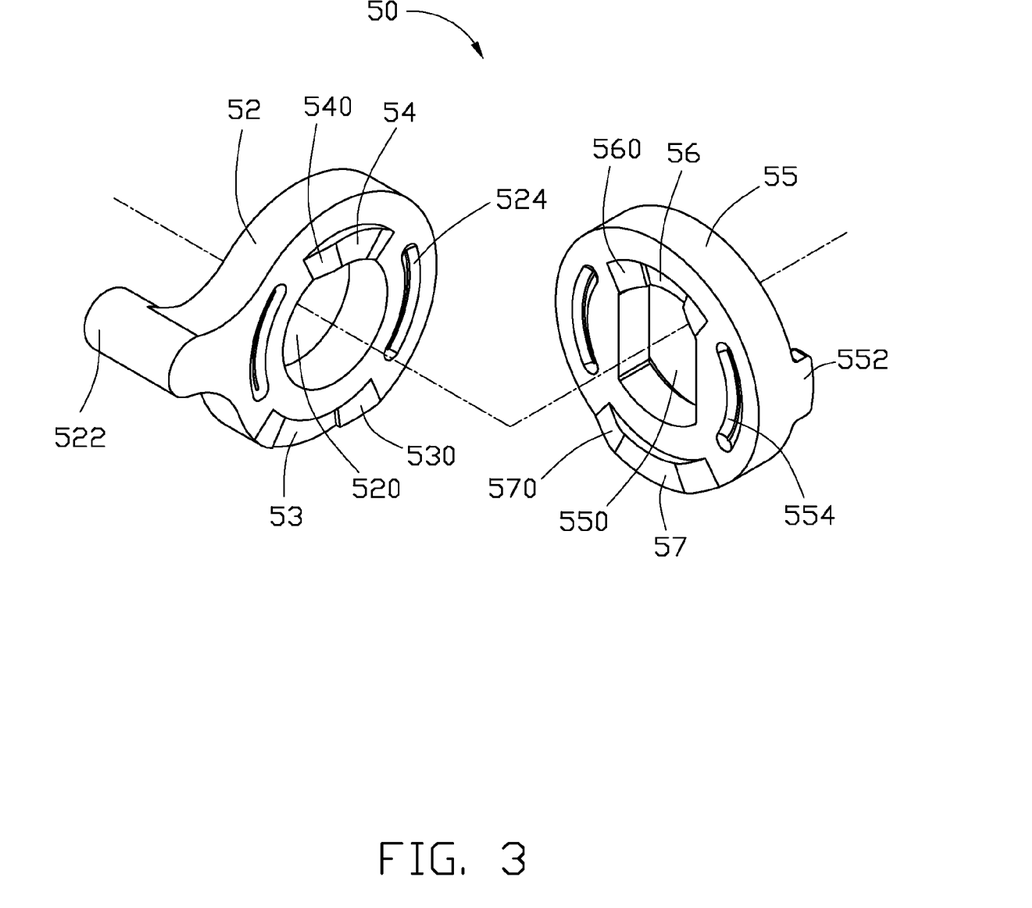
FIG. 3 is an enlarged view of the interference assembly in FIG. 1, the interference assembly including a first element and a second element.

Referring also to FIG. 3, the interference assembly 50 includes a first element 52, and a second element 55 engaging with and rotating relative to the first element 52.

The first element 52 is generally washer-shaped and defines a round through hole 520 in a center thereof through from a first side to a second side, for the fixing rod 16 of the shaft 10 passing therethrough. The first side of the first element 52 faces the second element 55 and defines an arc-shaped first depressed portion 53 along a circumference of the first element 52. A first raised portion 54 protrudes from the first side of the first element 52 around the through hole 520. The first depressed portion 53 and the first raised portion 54 are opposite each other across the through hole 520. Each end of the first depressed portion 53 includes a slanting connecting surface 530 to connect a bottom of the first depressed portion 53 to the first side. Each end of the first raised portion 54 includes a slanting connecting surface 540 to connect a top of the first raised portion 54 to the first side. The first side of the first element 52 defines a plurality of recessed portions 524 for retaining lubricating oil. A protrusion extends from the circumference of the first element 52, with a fastening post 522 extending from a distal end thereof along an axial direction and away from the second element 52. The fastening post 522 is capable of being engaged in the fastening hole 36 of the second bracket 30, for fixing the first element 52 to the second bracket 30.

The second element 55 is generally washer-shaped and defines a double-D shaped through hole 550 for non-rotationally fitting about the fixing rod 16 of the shaft 10. The second element 55 includes a first side, and a second side facing the first side of the first element 52. Two symmetrical fixing portions 552 perpendicularly extend from an edge of the first side of the second element 55. The second side of the second element 55 defines a plurality of recessed portions 554 for retaining lubricating oil. The second side of the second element 55 defines an arc-shaped second depressed portion 56 around the through hole 550. A second raised portion 57 protrudes from the second side of the second element 55 along the circumference of the second element 55. The second depressed portion 56 and the second raised portion 57 are opposite each other across the through hole 550. Each end of the second depressed portion 56 includes a slanting connecting surface 560 to connect a bottom of the second depressed portion 56 to the second side. Each end of the second raised portion 57 includes a slanting connecting surface 570 to connect a top of the second raised portion 57 to the second side.

Each buffer member 60 defines a double-D shaped through hole 62 in a center thereof for non-rotationally fitting about the fixing rod 16 of the shaft 10. The buffer member 60 defines a plurality of receiving holes 64 round the through hole 62 for receiving lubricating oil, and two symmetrical slots 66 in a circumference thereof.

The biasing member 70 includes a plurality of elastic elements horizontally stacked together, and each of the elastic elements defines a through hole 72 for fixing rod 16 of the shaft 10 passing therethrough.

Figure 4:
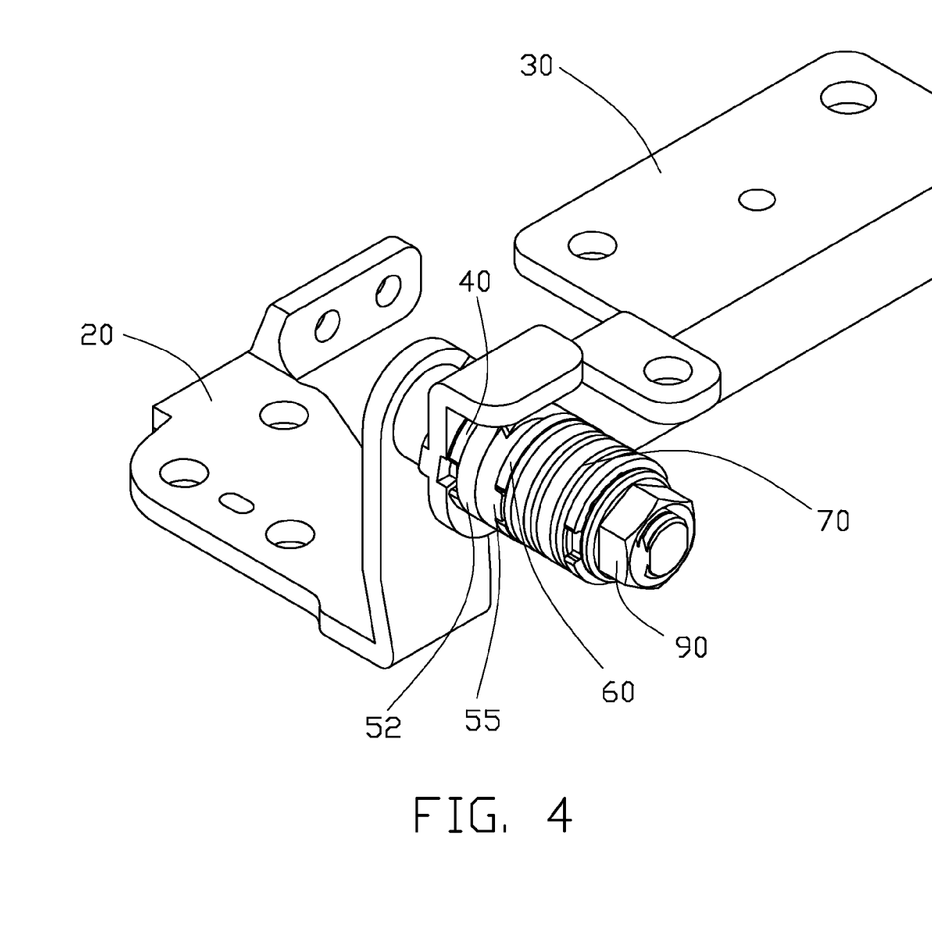
FIG. 4 is an assembled, isometric view of the FIG. 1.

Referring also to FIG. 4, in assembly, the conjoining portion 14 of the shaft 10 is inserted into and fixed in the fixing hole 22 of the first bracket 20, so the shaft 10 can rotate together with the first bracket 20. The fixing rod 16 of the shaft 10 is passed though the through hole 32 of the second bracket 30, the through hole 42 of the washer 40, the through hole 520 of the first element 52, the through hole 550 of the second element 55, the through hole 62 of one of the buffer member 60, the through holes 72 of the elastic elements of the biasing member 70, and the through hole 62 of the other buffer member 60 in turn. The fastener 90 is engaged with the threaded portion 160 of the fixing rod 160 for fixing the fastener 90 to the shaft 10, which is configured for preventing the washer 40, the interference assembly 50, the buffer members 60, and the biasing member 70 from disengaging from the shaft 10. The washer 40 is fixed to the fixing rod 160 of the shaft 10 and located between the first element 52 and the second bracket 30, for increasing friction between the second bracket 30 and the washer 40. The blocking portion 34 of the second bracket 30 is resisted against the main body 12 of the shaft 10. The fastening post 522 of the first element 52 is engaged in the fastening hole 36 of the second bracket 30. The first side of the first element 52 faces the second side of the second element 55. The fixing portions 552 of the second element 55 are respectively engaged in the slots 66 of a corresponding buffer member 60, so the corresponding buffer member 60 is fixed to the second element 55.

In use, the second bracket 30 is fixed to a base (not shown) of a foldable device, such as a notebook computer. The first bracket 20 is fixed to a cover (not shown) of the foldable device, and rotatable synchronously with the cover relative to the base.

Figure 5:
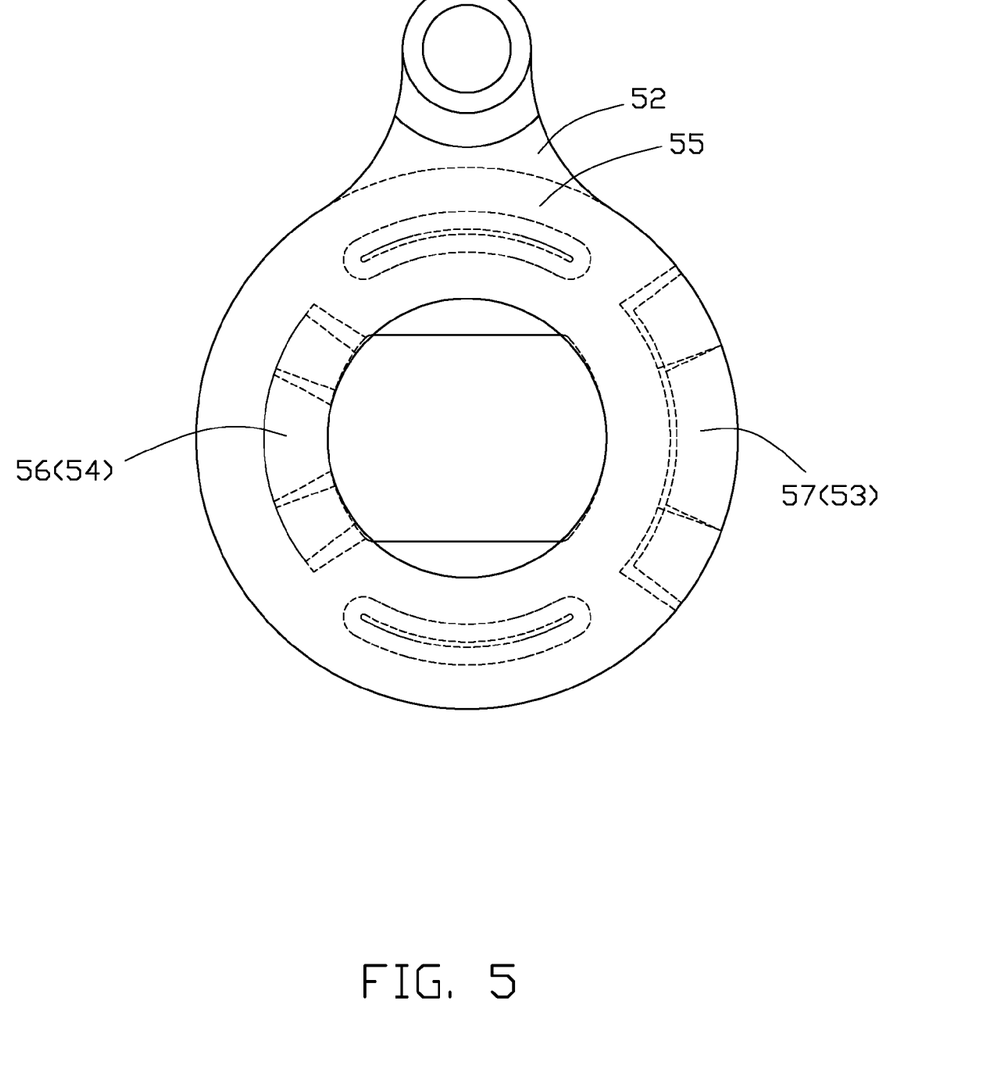
FIG. 5 is a top plan view of FIG. 3.

Referring also to FIG. 5, when the cover is folded to the base, the first element 52 is engaged with the second element 55. Therefore, the first depressed portion 53 and the first raised portion 54 of the first element 52 are respectively completely engaged with the second raised portion 57 and the second depressed portion 56 of the second element 55.

Figure 6:
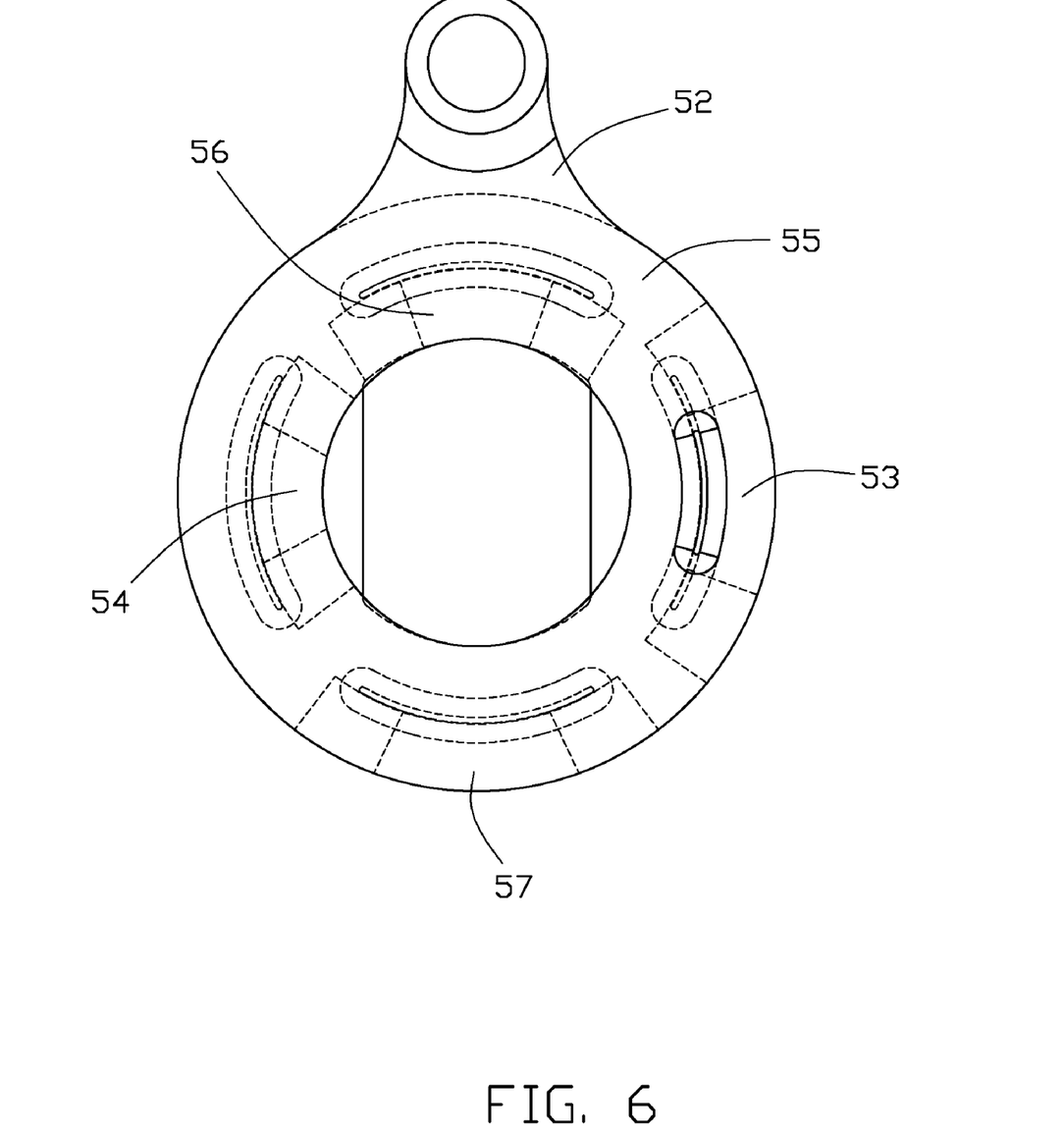
FIG. 6 is similar to FIG. 5, but showing the second element being rotated 90 degrees relative to the first element.

Referring also to FIG. 6, when the cover is rotated away from the base, the second element 55 together with the shaft 10, the washer 40, the buffer members 60, and the second bracket 30 is rotated with the cover. The second element 54 moves away from the first element 52 along the axial direction, because the second raised portion 57 of the second element 54 moves on a corresponding connecting surface 530 from the bottom of the first depressed portion 53, and the first raised portion 54 of the first element 52 moves on a corresponding connecting surface 560 from the bottom of the second depressed portion 56. When the cover is perpendicular to the base, the first and second raised portions 54, 57 are respectively fully disengaged from the second and first depressed portions 56, 53. The cover is rotated away from the base further, the first raised portion 54 of the first element 52 moves on the second side of the second element 55 without contacting the second raised portion 57, and the second raised portion 57 of the second element 55 moves on the first side of the first element 52 without contacting the first raised portion 54. When the stop portion 120 of the shaft 10 is resisted against the blocking portion 34 of the second bracket 30, the cover cannot be rotated any further.

When the cover is closed, the cover is moved toward the base. The first raised portion 54 of the first element 52 moves on the second side of the second element 55 without contacting the second raised portion 57, and the second raised portion 57 of the second element 55 moves on the first side of the first element 52 without contacting the first raised portion 54, until the cover is perpendicular to the base. The cover is further moved toward the base, the first and second raised portions 54, 57 are respectively moved over the connecting surfaces 560, 530, to enter into the second and first depressed portions 56, 53. When the angle between the cover and the base becomes small, the cover is released and continues to rotate because of gravity, but does so slowly for preventing the cover from bumping against the base with too much force. When the first and second raised portions 54, 57 are respectively completely engaged in the second and first depressed portions 56, 53, the cover is covered on the base.

Figure 7:
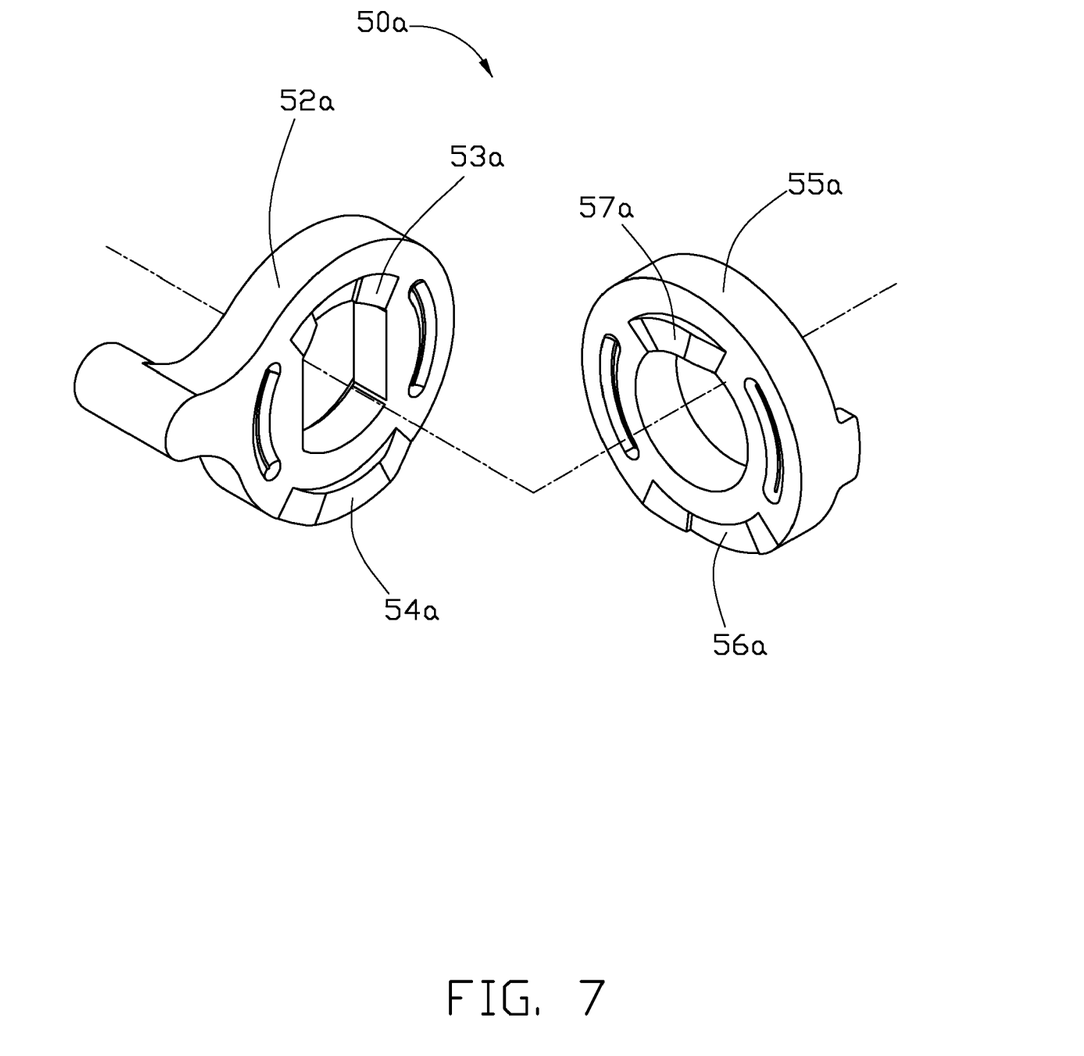
FIG. 7 is an enlarged view of the interference assembly in accordance with a second embodiment of the present invention.

Referring to the FIG. 7, according to a second embodiment, the interference assembly 50a includes a first element 52a and a second element 55a rotated relative to the first element 52a. The first element 52a defines a double-D shaped through hole in a center thereof through a first side to a second side. The first side of the first element 52a facing the second element 55a defines a first depression portion 53a around the through hole. A first raised portion 54a protrudes from the first side of the first element 52a along a circumference of the first element 52a. The second element 55a defines a round through hole in a center thereof. A side of the second element 55a facing the first side of the first element 52a defines a second depression portion 56a along a circumference of the second element 55a. A second raised portion 57a protrudes from the side of the second element 55a around the through hole. The first and second raised portions 54a, 57a are respectively capable of being engaged in the second and first depression portions 56a, 53a.

It is believed that the present embodiments and theirs advantages will be understood from the foregoing description, and it will be apparent that various changes may be made thereto without departing from the spirit and scope of the invention or sacrificing all of its material advantages, the examples hereinbefore described merely being a preferred or exemplary embodiments.

What is claimed is:

1. An interference assembly of a hinge, comprising:
   a washer-shaped first element defining a through hole in a central thereof, wherein a first side surface of the first element defines a first depression portion, a first raised portion protrudes from the first side surface of the first element, the first depression portion and the first raised portion are opposite each other across the through hole; and
   a washer-shaped second element capable of rotating relative to the first element, the second element defining a fixing hole in a central thereof, wherein a second side surface of the second element facing the first side surface of the first element defines a second depression portion for engaging with the first raised portion, a second raised portion protrudes from the second side surface of the second element for engaging with the first depression portion, the second depression portion and the second raised portion are opposite each other across the fixing hole.

2. The interference assembly as claimed in claim 1, wherein the first depression portion comprises two slanting connecting surfaces at opposite ends thereof, to connect a bottom thereof to the first side surface of the first element.

3. The interference assembly as claimed in claim 1, wherein the second depression portion comprises two slanting connecting surfaces at opposite ends thereof, to connect a bottom thereof to the second side surface of the second element.

4. The interference assembly as claimed in claim 1, wherein the first raised portion comprises two slanting connecting surfaces at opposite ends thereof, to connect a top thereof to the first side surface of the first element.

5. The interference assembly as claimed in claim 1, wherein the second raised portion comprises two slanting connecting surfaces at opposite ends thereof, to connect a top thereof to the second side surface of the second element.

6. The interference assembly as claimed in claim 1, wherein the first depression portion is along a circumference of the first element and away from the through hole;
the first raised portion is surrounding the through hole;
the second depression portion is surrounding the fixing hole; and
the second raised portion is along a circumference of the second element and away from the fixing hole.

7. The interference assembly as claimed in claim 1, the first depression portion is surrounding the through hole;
the first raised portion is along a circumference of the first element and away from the through hole;
the second depression portion is along a circumference of the second element and away from the fixing hole; and
the second raised portion is surrounding the fixing hole.

8. A hinge comprising,
a first bracket;
a shaft fixed to the first bracket;
an interference assembly mounted to the shaft, the interference assembly comprising a first element and a second element, the first element defining a through hole in a central thereof, the second element defining a fixing hole in a central thereof;
a biasing member mounted to the shaft; and
a fastener fixed to a distal end of the shaft, to prevent the interference assembly and the biasing member from disengaging from the shaft;
wherein a first side surface of the first element defines a first depression portion, a first raised portion protrudes from the side of the first element, the first depression portion and the first raised portion are opposite each other across the through hole; and
a second side surface of the second element facing the first side surface of the first element defines a second depression portion for engaging with the first raised portion, a second raised portion protrudes from the side of the second element for engaging with the first depression portion, the second depression portion and the second raised portion are opposite each other across the fixing hole.

9. The hinge as claimed in claim 8, wherein the first depression portion is along a circumference of the first element and away from the through hole;
the first raised portion is surrounding the through hole;
the second depression portion is surrounding the fixing hole; and
the second raised portion is along a circumference of the second element and away from the fixing hole.

10. The hinge as claimed in claim 8, wherein the first depression portion is surrounding the through hole;
the first raised portion is along a circumference of the first element and away from the through hole;
the second depression portion is along a circumference of the second element and away from the fixing hole; and
the second raised portion is surrounding the fixing hole.

11. The hinge as claimed in claim 8, wherein the shaft comprises a main body and a non-circular fixing rod extending from an end of the main body, and a stop portion protrudes from a circumference of the main body; and
the first bracket defines a through hole for the fixing rod rotatably passing therethrough, and a blocking portion extends from the first bracket surrounding the through hole;
wherein the stop portion is capable of resisting against the blocking portion to stop the rotation between the shaft and the first bracket.

12. The hinge as claimed in claim 8, further comprising a buffer member, wherein the buffering member defines two symmetry clamping slots adjacent a circumference thereof; and
two symmetry fixing portions respectively extend perpendicularly from an edge of the second element, the fixing portions are respectively engaged in the clamping slots.

13. The hinge as claimed in claim 8, further comprising a second bracket, wherein the second bracket defines a semicircular fixing hole; and
a semicircular conjoining portion opposite to the fixing rod extends from the main body, the semicircular conjoining portion is engaged in the fixing hole, for fixing the shaft to the second bracket.

14. The hinge as claimed in claim 8, wherein the first bracket defines a fastening hole therein; and
a fastening post extends from a side of the first element, to be engaged in the fastening hole.

15. The hinge as claimed in claim 8, further comprising a washer, wherein the washer is fixed to the shaft between the first element and the first bracket.

* * * * *